(12) United States Patent
Moon

(10) Patent No.: US 11,842,073 B2
(45) Date of Patent: Dec. 12, 2023

(54) MEMORY CONTROLLER AND OPERATING METHOD THEREOF

(71) Applicant: SK hynix Inc., Gyeonggi-do (KR)

(72) Inventor: Min Hwan Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/161,155

(22) Filed: Jan. 28, 2021

(65) Prior Publication Data

US 2022/0043600 A1 Feb. 10, 2022

(30) Foreign Application Priority Data

Aug. 6, 2020 (KR) .......................... 10-2020-0098781

(51) Int. Cl.
  *G06F 3/06* (2006.01)
(52) U.S. Cl.
  CPC .......... *G06F 3/0659* (2013.01); *G06F 3/0611* (2013.01); *G06F 3/0673* (2013.01)
(58) Field of Classification Search
  CPC ..... G06F 3/0659; G06F 3/0611; G06F 3/0673
  See application file for complete search history.

(56) References Cited

U.S. PATENT DOCUMENTS

| | | | |
|---|---|---|---|
| 8,775,720 B1 * | 7/2014 | Meyer ................... | G06F 3/0659 |
| | | | 711/E12.019 |
| 2007/0038798 A1 * | 2/2007 | Bouchard ............... | G06F 12/06 |
| | | | 711/3 |
| 2018/0335978 A1 * | 11/2018 | Tidwell ..................... | G06F 1/28 |
| 2019/0227749 A1 * | 7/2019 | Wakchaure ........... | G06F 3/0659 |

FOREIGN PATENT DOCUMENTS

| KR | 10-2018-0006101 | 1/2018 |
|---|---|---|
| KR | 10-2019-0008679 | 1/2019 |

* cited by examiner

*Primary Examiner* — Gary W. Cygiel
(74) *Attorney, Agent, or Firm* — IP & T GROUP LLP

(57) ABSTRACT

The present disclosure relates to a memory controller and a method of operating the memory controller. The memory controller controlling a memory device including a plurality of planes includes a central processing unit (CPU) generating a command corresponding to a request from a host, a command queue storing the command, counter logic assigning to the command, number information corresponding to an order in which the command is generated and flag information indicating a level at which an operation corresponding to the command is performed, and a command queue controller controlling the command queue to transfer the command stored in the command queue to one of the plurality of planes corresponding to the command on the basis of the number information and the flag information.

10 Claims, 14 Drawing Sheets

MEMORY CONTROLLER AND OPERATING METHOD THEREOF

CROSS-REFERENCE TO RELATED APPLICATION

The present application claims priority under 35 U.S.C. § 119(a) to Korean patent application number 10-2020-0098781 filed on Aug. 6, 2020, in the Korean Intellectual Property Office, the entire disclosure of which is incorporated by reference herein.

BACKGROUND

1. Technical Field

Various embodiments relate generally to an electronic device, and more particularly, to a memory controller and a method of operating the memory controller.

2. Related Art

A storage device is configured to store data in response to control of a host device such as a computer or a smartphone. A storage device may include a memory device storing data and a memory controller controlling the memory device. Generally, there are two types of memory devices: volatile memory devices and non-volatile memory devices.

A volatile memory device may retain data as long as power is being supplied, and may lose the stored data in the absence of power supply. Types of the volatile memory device include Static Random Access Memory (SRAM), Dynamic Random Access Memory (DRAM), and the like.

A non-volatile memory device may not lose data even in the absence of power supply. Types of the non-volatile memory device include Read Only Memory (ROM), Programmable ROM (PROM), Electrically Programmable ROM (EPROM), Electrically Erasable and Programmable ROM (EEPROM) and flash memory.

SUMMARY

Various embodiments of the present disclosure are directed to a memory controller having improved command management and a method of operating the memory controller.

According to an embodiment, a memory controller controlling a memory device including a plurality of planes may include a central processing unit (CPU) generating a command corresponding to a request from a host, a command queue storing the command, counter logic assigning to the command, number information corresponding to an order in which the command is generated and flag information indicating a level at which an operation corresponding to the command is performed, and a command queue controller controlling the command queue to transfer the command stored in the command queue to one of the plurality of planes corresponding to the command on the basis of the number information and the flag information.

According to an embodiment, a method of operating a memory controller controlling a memory device including a plurality of planes may include generating a command corresponding to a request from a host, assigning to the command, number information corresponding to an order in which the command is generated and flag information indicating a level at which an operation corresponding to the command is performed, storing the command in a plane queue corresponding to the command among a plurality of plane queues, and transferring the command to the memory device on the basis of the number information and the flag information.

According to an embodiment, an operating method of a controller, the operating method may include queueing in a lower level command to one of plural queues according to a target address of the lower level command and queueing in a higher level command to one of the queues according to estimated amounts of time for a memory device to process commands stored in the respective queues and, queueing out commands from the queues to control the memory device, wherein the queueing in and the queueing out is performed on a first-in-first-out (FIFO) basis for each of the queues, wherein the queueing out includes pausing, while queueing out the higher level command, the queueing out of all lower level commands that are queued in the queues later than the higher level command, wherein a group of the queues corresponds to a higher level storage in the memory device, wherein each of the queues corresponds to at least one of multiple lower level storages configuring the higher level storage.

According to an embodiment, an operating method of a controller, the operating method may include queueing in a lower level command to one of plural queues according to a target address of the lower level command and queueing in a higher level command to one of the queues according to estimated amounts of time for a memory device to process commands queued in the respective queues and, queueing out commands from the queues to control the memory device, wherein the queueing in and the queueing out is performed, among lower level commands, on a first-in-first-out (FIFO) basis for each of the queues, wherein the queueing in and the queueing out is performed, among higher level commands and lower level commands, on a FIFO basis for a group of the queues, wherein the group of the queues corresponds to a higher level storage in the memory device, wherein each of the queues corresponds to at least one of multiple lower level storages configuring the higher level storage.

DETAILED DESCRIPTION

Specific structural and functional description is provided herein only to describe embodiments of the invention. However, the invention may be configured in various forms and carried out in various ways. Thus, the invention is not limited to or by any of the disclosed embodiments.

Rather, as those skilled in the art will recognize in view of the present disclosure, various modifications and changes may be made to any of the disclosed embodiments within the spirit and scope of the invention. Thus, the invention includes all changes, equivalents, and substitutes that do not depart from the spirit and technical scope of the present disclosure. Also, description of techniques that are well known to the art to which the present disclosure pertains, and are not directly related to the present disclosure may be omitted so as not to unnecessarily obscure features and aspects of the invention.

Various embodiments of the present disclosure are described in detail below with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
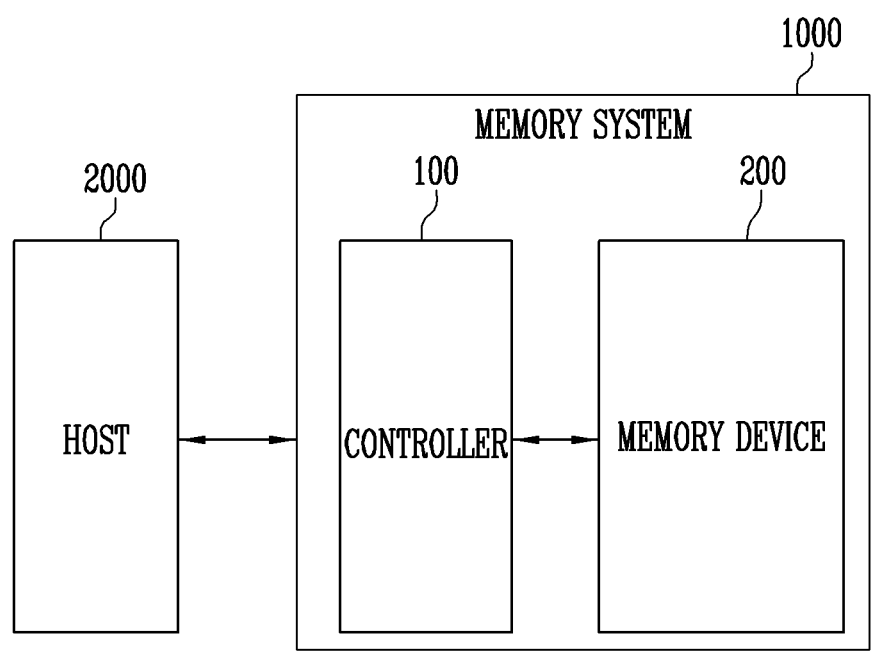
FIG. 1 is a block diagram illustrating a memory system according to an embodiment of the present disclosure.

FIG. 1 is a block diagram illustrating a memory system 1000 according to an embodiment of the present disclosure.

Referring to FIG. 1, the memory system 1000 may include a controller 100 and a memory device 200. The controller 100 may also be referred to as a memory controller.

The memory system 1000 may be configured to store data in response to control of a host 2000. Examples of the memory system 1000 include a cellular phone, a smartphone, an MP3 player, a laptop computer, a desktop computer, a game player, a tablet PC, and an in-vehicle infotainment system.

The memory system 1000 may be configured or manufactured as any of various types of storage devices according to a host interface that sets a communication method with the host 2000. For example, the memory system 1000 may be configured as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, and/or a memory stick.

The memory system 1000 may be manufactured as any of various types of packages. For example, the memory system 1000 may be manufactured as a package-on-package (POP), a system-in-package (SIP), a system-on-chip (SOC), a multi-chip package (MCP), a chip-on-board (COB), a wafer-level fabricated package (WFP), and/or a wafer-level stack package (WSP).

The controller 100 may control general operation of the memory system 1000 and control data exchange between the host 2000 and the memory device 200. For example, the controller 100 may convert received information, and store and output the converted information so that commands, addresses, and data may be exchanged between the host 2000 and the memory device 200. For example, during a program operation, the controller 100 may transfer commands, addresses, and data to the memory device 200.

In addition, when power is applied to the memory system 1000, the controller 100 may execute firmware FW. The firmware FW may include a host interface layer HIL receiving a request input from the host 2000 or outputting a response to the host 2000, a flash translation layer FTL managing operations between an interface of the host 2000 and an interface of the memory device 200, and a flash interface layer FIL providing a command to the memory device 200 or receiving a response from the memory device 200.

The controller 100 may receive data and a logical address LA from the host 2000 and convert the logical address LA into a physical address PA indicating an address of memory cells in which the data in the memory device 200 is stored. The logical address LA may be a logical block address LBA and the physical address PA may be a physical block address PBA.

The controller 100 may control the memory device 200 to perform an internal operation including a program operation, a read operation or an erase operation in response to a request from the host 2000. During a program operation, the controller 100 may provide a program command, a physical block address, and data to the memory device 200. During a read operation, the controller 100 may provide a read command and a physical block address to the memory device 200. During an erase operation, the controller 100 may provide an erase command and a physical block address to the memory device 200.

Alternatively, the controller 100 may control the memory device 200 to perform an internal operation including a program operation, a read operation or an erase operation in the absence of a request from the host 2000. For example, the controller 100 may autonomously control the memory device 200 to perform a program operation, a read operation, or an erase operation used to perform background operations such as wear leveling, garbage collection and read reclaim.

The memory device 200 may store data. More specifically, the memory device 200 may operate in response to control of the controller 100. In addition, the memory device 200 may include a memory cell array including a plurality of memory cells storing data. Each of the memory cells may be a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks, each of which may include a plurality of memory cells. In addition, each memory block may include a plurality of pages. According to an embodiment, a page may be a unit for storing data in the memory device 200 or for reading data stored in the memory device 200, and a memory block may be a unit for erasing data.

According to an embodiment, the memory device 200 may include any of Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change memory (PRAM), magnetoresistive random access memory (MRAM), ferroelectric random access memory (FRAM), and/or spin transfer torque random access memory (STT-RAM). By way of example, in the description below it is assumed that the memory device 200 is a NAND flash memory. However, as noted above, the memory device 200 is not limited to a NAND flash memory but may be embodied as any of various types of memory devices.

The memory device 200 may be a NAND flash memory. The memory device 200 may receive a command and an address from the controller 100. The memory device 200 may be configured to access an area selected in response to the received address in the memory cell array. When the memory device 200 accesses the selected area, the memory device 200 may perform an operation corresponding to the received command on the selected area. For example, the memory device 200 may perform a write operation (program operation), a read operation, and an erase operation. During a program operation, the memory device 200 may program data into the area selected by the address. During a read operation, the memory device 200 may read data from the area selected by the address. During an erase operation, the memory device 200 may erase the data stored in the area selected by the address.

According to another embodiment, the memory device 200 may be a dynamic random access memory (RAM). The memory device 200 may receive a command and an address from the controller 100. The memory device 200 may be configured to access an area selected in response to the received address in the memory cell array. When the memory device 200 accesses the selected area, the memory device 200 may perform an operation corresponding to the received command on the selected area. For example, the memory device 200 may perform a data input/output operation or a refresh operation. The data input/output operation may refer to an operation in which the memory device 200 receives data to store the data in the area selected by the address, or reads the stored data by outputting the data. The refresh operation may be performed so that the memory device 200 may retain the stored data.

The memory device 200 may include a memory cell. The memory device 200 may perform an internal operation on the memory cell in response to control of the controller 100. The internal operation on the memory cell may include at least one of a program operation, a read operation and an erase operation. According to another embodiment, the internal operation on the memory cell may include at least one of a data input/output operation and a refresh operation.

The host 2000 may communicate with the memory system 1000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and/or Load Reduced DIMM (LRDIMM) communication methods.

Figure 2:
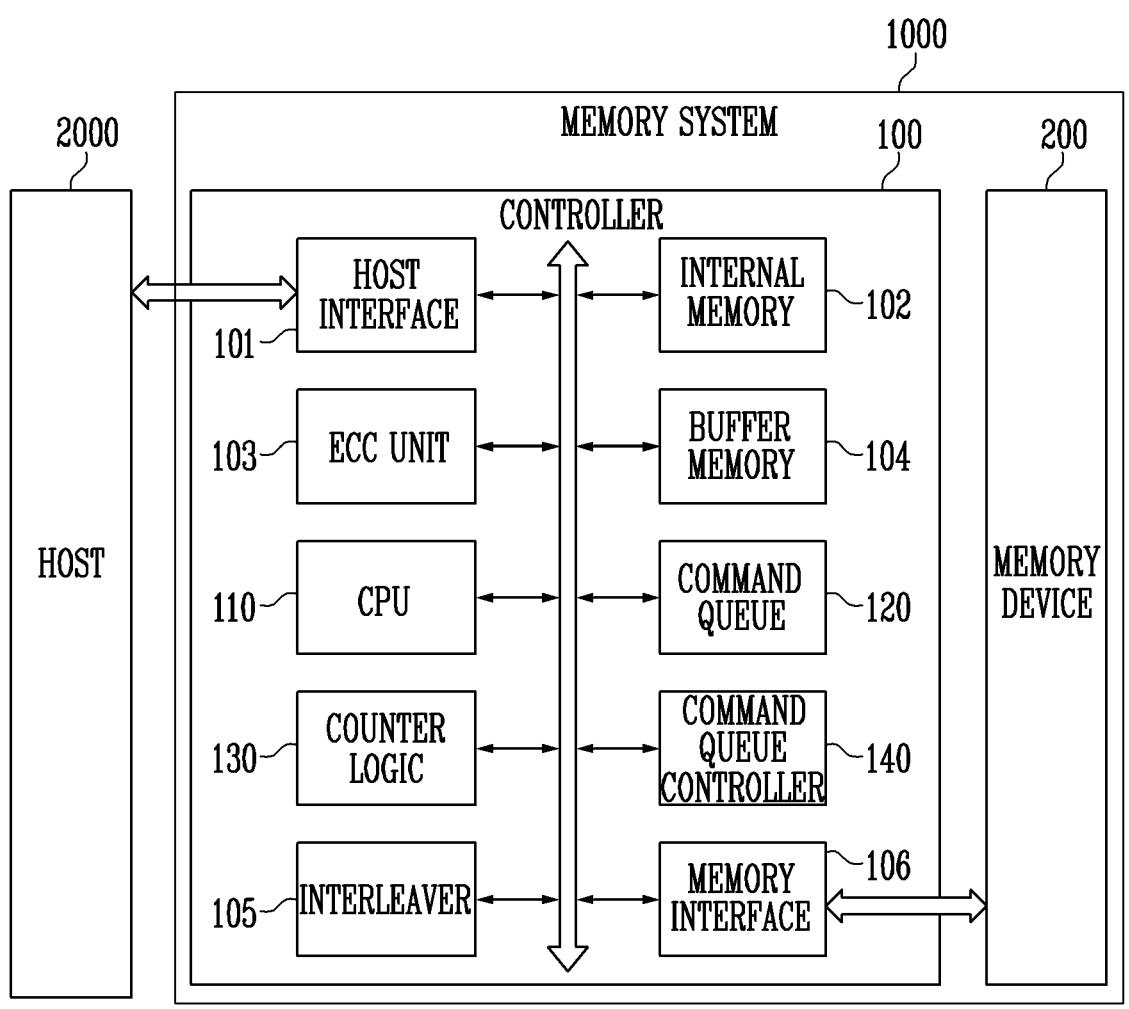
FIG. 2 is a diagram illustrating details of a controller, such as that of FIG. 1.

FIG. 2 is a diagram showing details of the controller 100 of FIG. 1.

Referring to FIG. 2, the controller 100 may include a host interface 101, an internal memory 102, an ECC component (unit) 103, a buffer memory 104, an interleaver 105, a memory interface 106, a central processing unit (CPU) 110, a command queue 120, a counter logic 130, and a command queue controller 140.

The host interface 101 may include a protocol for exchanging data between the host 2000 and the controller 100. More specifically, the host interface 101 may communicate with the host 2000 through one or more various protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer System interface (SCSI) protocol, an enhanced small disk interface (ESDI) protocol, an integrated drive electronics (IDE) protocol, a private protocol, etc.

The internal memory 102 may serve as a storage for storing various kinds of information for operations of the controller 100. More specifically, the internal memory 102 may include a map table that stores physical-logical address information and logical-physical address information. In addition, the internal memory 102 may be controlled by the CPU 110.

The ECC component 103 may detect error(s) during a program operation or a read operation and correct the error(s). More specifically, the ECC component 103 may perform an error correction operation according to an error correction code (ECC). In addition, the ECC component 103 may perform ECC encoding based on data to be written to the memory device 200. The ECC-encoded data may be transferred to the memory device 200 through the memory interface 106. In addition, the ECC component 103 may perform ECC decoding on the data transferred from the memory device 200 through the memory interface 106.

The buffer memory 104 may serve as a working memory or a cache memory of the CPU 110. In addition, the buffer memory 104 may store codes and commands executed by the CPU 110. The buffer memory 104 may store data processed by the CPU 110. In addition, the buffer memory 104 may be realized with static RAM (SRAM) or dynamic RAM (DRAM).

The interleaver 105 may identify an operation performed by each of multiple memory units, e.g., dies, in the memory device 200. The operation may be a program operation, a read operation or an erase operation. More specifically, the interleaver 105 may receive from the memory device 200 information about progress or termination of the operation performed by each memory unit through the memory interface 106, and may identify the operation performed by each memory unit based on the received information.

The CPU 110 may control the memory interface 106 to communicate with the memory device 200 using a communication protocol. More specifically, the memory interface 106 may transmit/receive commands, addresses, and data to/from the memory device 200 through channels.

Communication may be performed with the memory device 200 using the memory interface 106.

The CPU 110 may communicate with the host 2000 using the host interface 101 and perform a logical operation so as to control the operations of the controller 100. For example, the CPU 110 may load program commands, data files, data structure, etc. based on a request from the host 2000 or other external device, and may perform various operations or generate commands or addresses. For example, the CPU 110 may generate various commands for a program operation, a read operation, an erase operation, a suspend operation and a parameter setting operation.

In addition, the CPU 110 may control the memory units to perform operations according to an interleaving scheme. The CPU 110 may generate a command and input (i.e., queue-in) the generated command to the command queue 120. According to an embodiment, the CPU 110 may control the command queue 120 so that the command may be stored (i.e., queued-in) in a plane queue in the command queue 120 based on a score (score information) from the command queue controller 140.

In addition, the CPU 110 may function as the flash translation layer FTL. The CPU 110 may translate the logical block address LBA provided by the host into the physical block address PBA through the flash translation layer FTL. The flash translation layer FTL may receive the logical block address LBA and translate the logical block address LBA into the physical block address PBA by using a mapping table. There may be various address mapping methods of the flash translation layer FTL, based on a mapping unit. Typical address mapping methods may include a page mapping method, a block mapping method and a hybrid mapping method.

The CPU 110 may derandomize data from the memory device 200 during a read operation. For example, the CPU 110 may derandomize the data from the memory device 200 using a derandomizing seed. The CPU 110 may output the derandomized data to the host 2000 using the host interface 101. According to an embodiment, the CPU 110 may run software or firmware to perform randomization and derandomization.

According to an embodiment, the CPU 110 may generate a command without a request of the host 2000 and input the generated command to the command queue 120. For example, the CPU 110 may generate a command for background operations such as wear leveling operations of the memory device 200 and garbage collection operations of the memory device 200.

The command queue 120 may store (i.e., queue-in) the command generated by the CPU 110 and output (i.e., queue-out) the stored (i.e., queued-in) command to a corresponding one of a plurality of planes. More specifically, the command queue 120 may include a plurality of plane queues, each of which may queue-in and queue-out commands on a first in first out (FIFO) basis. The command queue 120 may receive (i.e., queue-in) a command from the CPU 110 and output (i.e., queue-out) the received (i.e., queued-in) command to a plane corresponding to each plane queue in response to control of the command queue controller 140.

The controller 100 may include the counter logic 130 and the command queue controller 140. The counter logic 130 and the command queue controller 140 are described below in detail with reference to FIG. 8. According to another example, the CPU 110 may function as the counter logic 130 or the command queue controller 140, or the CPU 110 may include the counter logic 130 and/or the command queue controller 140 as a subordinate hardware module.

Figure 3:
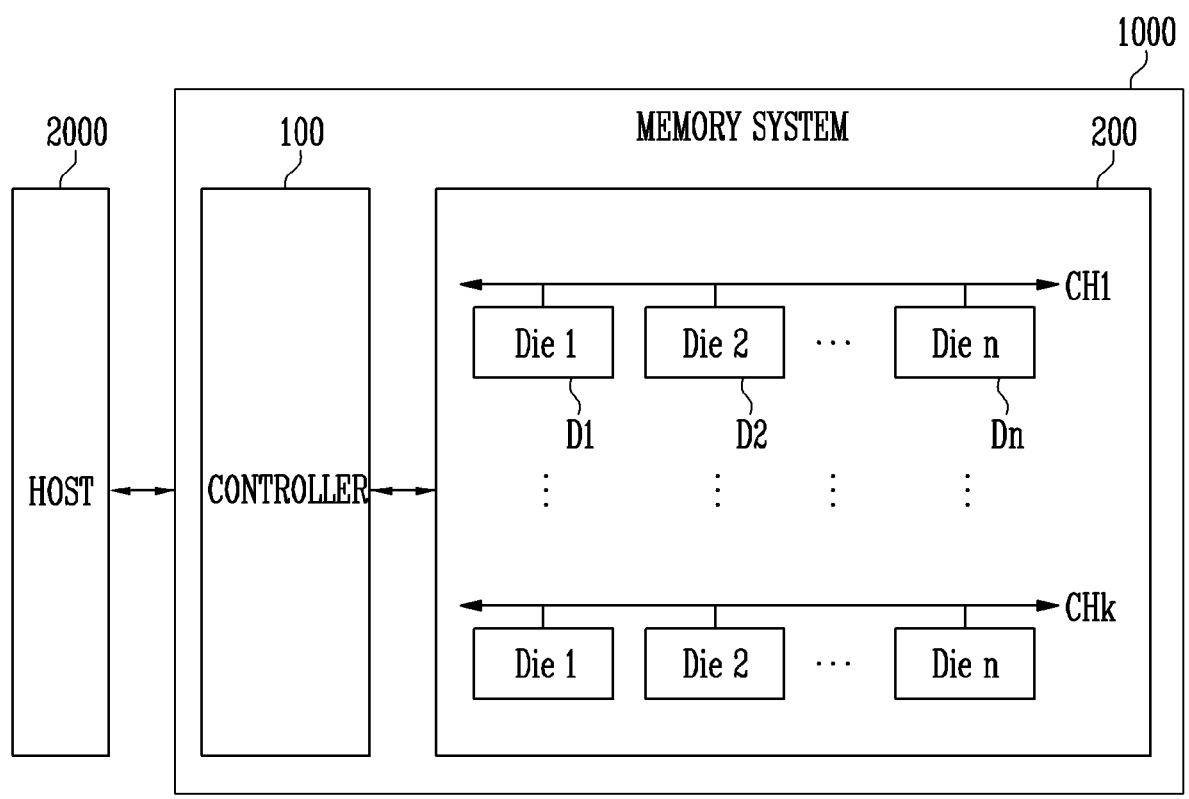
FIG. 3 is a block diagram of a memory device, such as that of FIG. 1.

FIG. 3 is a block diagram of the memory device 200 of FIG. 1.

Referring to FIG. 3, the memory device 200 may include a plurality of channels CH1 to CHk and a plurality of sets of dies D1 to Dn, each set of which is coupled to a respective channel. In addition, the controller 100 may be coupled to the memory device 200 through the plurality of channels CH1 to CHk. More specifically, the controller 100 may be coupled to each set of dies D1 to Dn through their corresponding channel.

The controller 100 may control the plurality of dies to operate independently of each other. For example, since the first die D1 coupled to the first channel CH1 and the first die D1 coupled to the kth channel CHk do not have a common circuit or structure for performing an internal operation, the controller 100 may control the dies so that Die 1 coupled to CH1 and Die 1 coupled to CHk may operate independently of each other. In addition, the controller 100 may cause the set of dies Die 1 to Die n coupled to the same channel (e.g., first channel CH1 or kth channel CHk) to operate at the same time.

Figure 4:
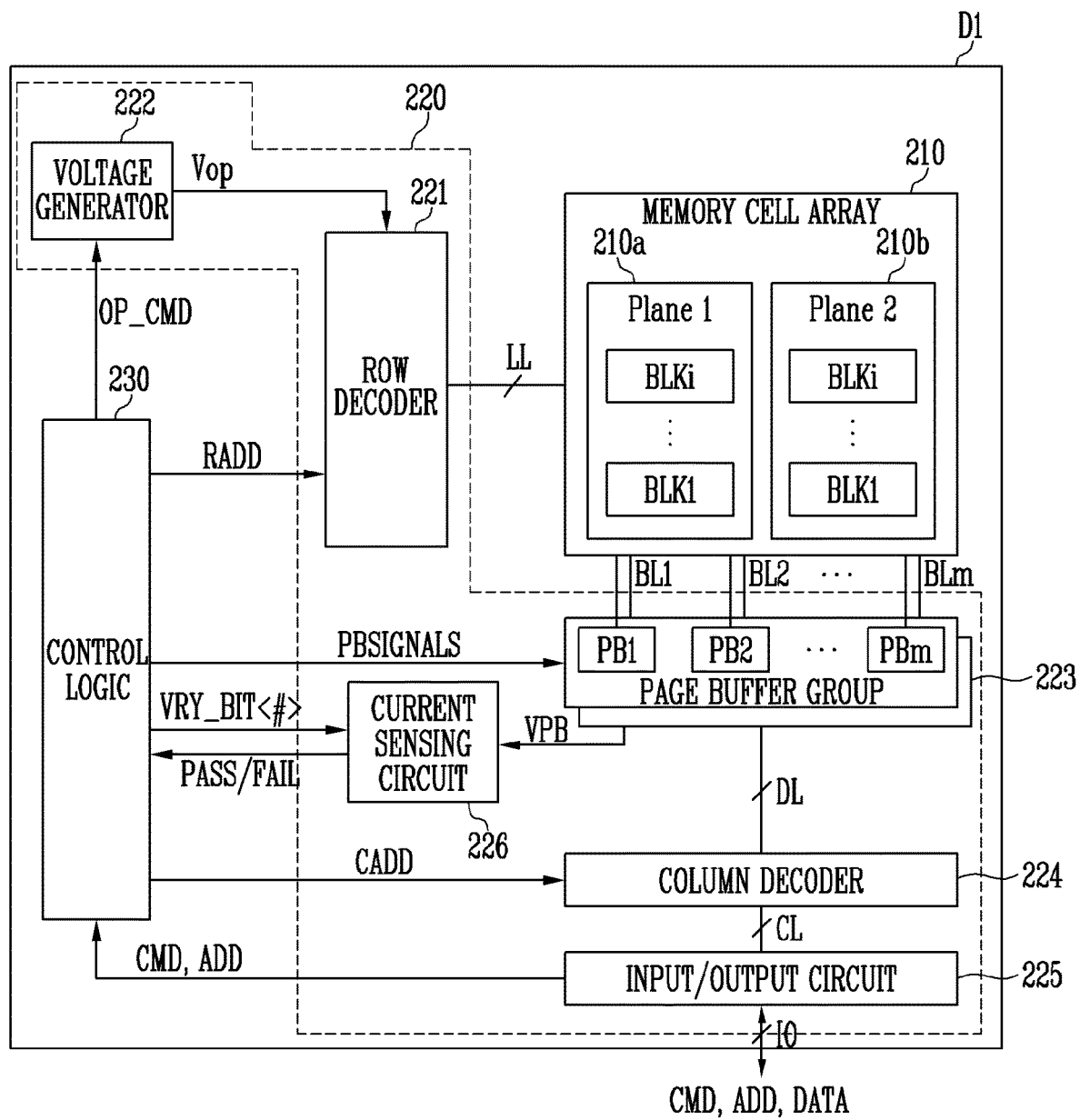
FIG. 4 is a diagram illustrating details of a die, such as that of FIG. 3.

FIG. 4 is a detailed diagram of one of the dies D1 to Dn of FIG. 3. Each of the dies D1 to Dn as shown in FIG. 3 may have the same configuration. Thus, the first die D1 of the first channel CH1 is described below as an example. In addition, by way of example, FIG. 4 illustrates that one die includes two planes 210a and 210b. However, each die may have any suitable number of planes.

Referring to FIG. 4, D1 may include a memory cell array 210, a peripheral circuit 220 and control logic 230.

The memory cell array 210 may include a plurality of planes 210a and 210b. Each of the planes 210a and 210b may include a plurality of memory blocks BLK1 to BLKi, each of which may be coupled to a row decoder 221 through local lines LL. In addition, the plurality of memory blocks BLK1 to BLKi may be coupled to a page buffer group 223 through bit lines BL1 to BLm. Each of the plurality of memory blocks BLK1 to BLKi may include a plurality of memory cells. According to an embodiment, the plurality of memory cells may be non-volatile memory cells. Memory cells coupled to the same word line may be defined as one page. In other words, the memory cell array 210 may include a plurality of physical pages. Therefore, each memory block may include a plurality of pages.

Each of the memory cells included in the memory cell array 210 may be a single-level cell (SLC) storing a single data bit, a multi-level cell (MLC) storing two data bits, a triple-level cell (TLC) storing three data bits, or a quad-level cell (QLC) storing four data bits.

The peripheral circuit 220 may be configured to perform a program operation, a read operation, or an erase operation on a selected area of the memory cell array 210 in response to control of the control logic 230. The peripheral circuit 220 may drive the memory cell array 210. For example, the control logic 230 may control the peripheral circuit 220 to apply various operating voltages to the local lines LL and the bit lines BL1 to BLm, or to discharge the applied voltages.

The peripheral circuit 220 may include the row decoder 221, a voltage generator 222, a page buffer group 223, a column decoder 224, an input/output circuit 225, and a current sensing circuit 226.

The peripheral circuit 220 may drive the memory cell array 210. For example, the peripheral circuit 220 may drive the memory cell array 210 to perform a program operation, a read operation and an erase operation.

The row decoder 221 may be coupled to the memory cell array 210 through the local lines LL. The local lines LL may include at least one source select line, a plurality of word lines and at least one drain select line. According to an embodiment, the plurality of word lines may include normal word lines and dummy word lines. The local lines LL may further include a pipe select line.

The row decoder 221 may be configured to operate in response to control of the control logic 230. The row decoder 221 may receive a row address RADD from the control logic 230. In addition, the row decoder 221 may be configured to decode the row address RADD. The row decoder 221 may select at least one memory block among the memory blocks BLK1 to BLKi according to the decoded address. In addition, the row decoder 221 may select at least one word line of the selected memory block so as to apply voltages generated by the voltage generator 222 to at least one word line WL according to the decoded address.

For example, during a program operation, the row decoder 221 may apply a program voltage to the selected word line and a program pass voltage lower than the program voltage to unselected word lines. During a program verify operation, the row decoder 221 may apply a verify voltage to the selected word line and apply a verify pass voltage greater than the verify voltage to the unselected word lines. During a read operation, the row decoder 221 may apply a read voltage to the selected word line and a read pass voltage greater than the read voltage to the unselected word lines.

An erase operation of the memory device 200 may be performed in units of memory blocks. During an erase operation, the row decoder 221 may select one of the memory blocks according to the decoded address. During the erase operation, the row decoder 221 may apply a ground voltage to word lines coupled to the selected memory block.

The voltage generator 222 may operate in response to control of the control logic 230. The voltage generator 222 may be configured to generate a plurality of voltages by using an external power voltage supplied to the memory device 200. More specifically, the voltage generator 222 may generate various operating voltages Vop for performing program, read and erase operations in response to an operation signal OP_CMD. For example, the voltage generator 222 may generate a program voltage, a verify voltage, a pass voltage, a read voltage, and an erase voltage in response to the control of the control logic 230.

According to an embodiment, the voltage generator 222 may generate an internal power voltage by regulating an external power voltage. The internal power voltage generated by the voltage generator 222 may serve as an operating voltage of the memory device 200. In other words, the voltage generator 222 may generate a plurality of voltages by using the external power voltage or the internal power voltage.

For example, the voltage generator 222 may include a plurality of pumping capacitors receiving the internal power voltage and generate a plurality of voltages by selectively activating the plurality of pumping capacitors in response to control of the control logic 230. The plurality of generated voltages may be supplied to the memory cell array 210 by the row decoder 221.

The page buffer group 223 may include first to mth page buffers PB1 to PBm, which may be coupled to the memory cell array 210 through the first to mth bit lines BL1 to BLm, respectively. The first to mth page buffers PB1 to PBm may operate in response to the control of the control logic 230. More specifically, the first to mth page buffers PB1 to PBm may operate in response to page buffer control signals PBSIGNALS. For example, the first to mth page buffers PB1 to PBm may temporarily store data received through the first to mth bit lines BL1 to BLm, or may sense voltages or currents in the first to mth bit lines BL1 to BLm during a read or verify operation.

More specifically, during a program operation, the first to mth page buffers PB1 to PBm may transfer data DATA received through the input/output circuit 225 to selected memory cells through the first to mth bit lines BL1 to BLm when a program pulse is applied to a selected word line. The memory cells of the selected page may be programmed according to the transferred data DATA. A threshold voltage of a memory cell coupled to a bit line to which a program permission voltage (e.g., a ground voltage) is applied may be increased. A threshold voltage of a memory cell coupled to a bit line to which a program inhibition voltage (for example, a power voltage) is applied may be maintained. For example, during a program verify operation, the first to mth page buffers PB1 to PBm may read page data from the selected memory cells through the first to mth bit lines BL1 to BLm, respectively.

During a read operation, the first to mth page buffers PB1 to PBm may read the data DATA from the memory cells of the selected page through the first to mth bit lines BL1 to BLm and may output the read data DATA to the input/output circuit 225 in response to control of the column decoder 224.

During an erase operation, the first to mth page buffers PB1 to PBm may float the first to mth bit lines BL1 to BLm, respectively.

The column decoder 224 may transfer data between the input/output circuit 225 and the page buffer group 223 in response to a column address CADD. For example, the column decoder 224 may exchange data with the first to mth page buffers PB1 to PBm through data lines DL, or may exchange data with the input/output circuit 225 through column lines CL.

The input/output circuit 225 may transfer a command CMD and an address ADD from the controller 100 to the control logic 230, or may exchange the data DATA with the column decoder 224.

The current sensing circuit 226 may generate a reference current in response to an allowable bit signal VRY_BIT<#> and compare a sensing voltage VPB from the page buffer group 223 with a reference voltage generated by the reference current to output a pass signal PASS or a fail signal FAIL during a read operation or a verify operation.

The control logic 230 may control the peripheral circuit 220 by outputting the operation signal OP_CMD, the row address RADD, the page buffer control signals PBSIGNALS and the allowable bit signal VRY_BIT<#> in response to the command CMD and the address ADD. In addition, the control logic 230 may determine whether the verify operation passes or fails in response to the pass or fail signal PASS or FAIL.

Figure 5:
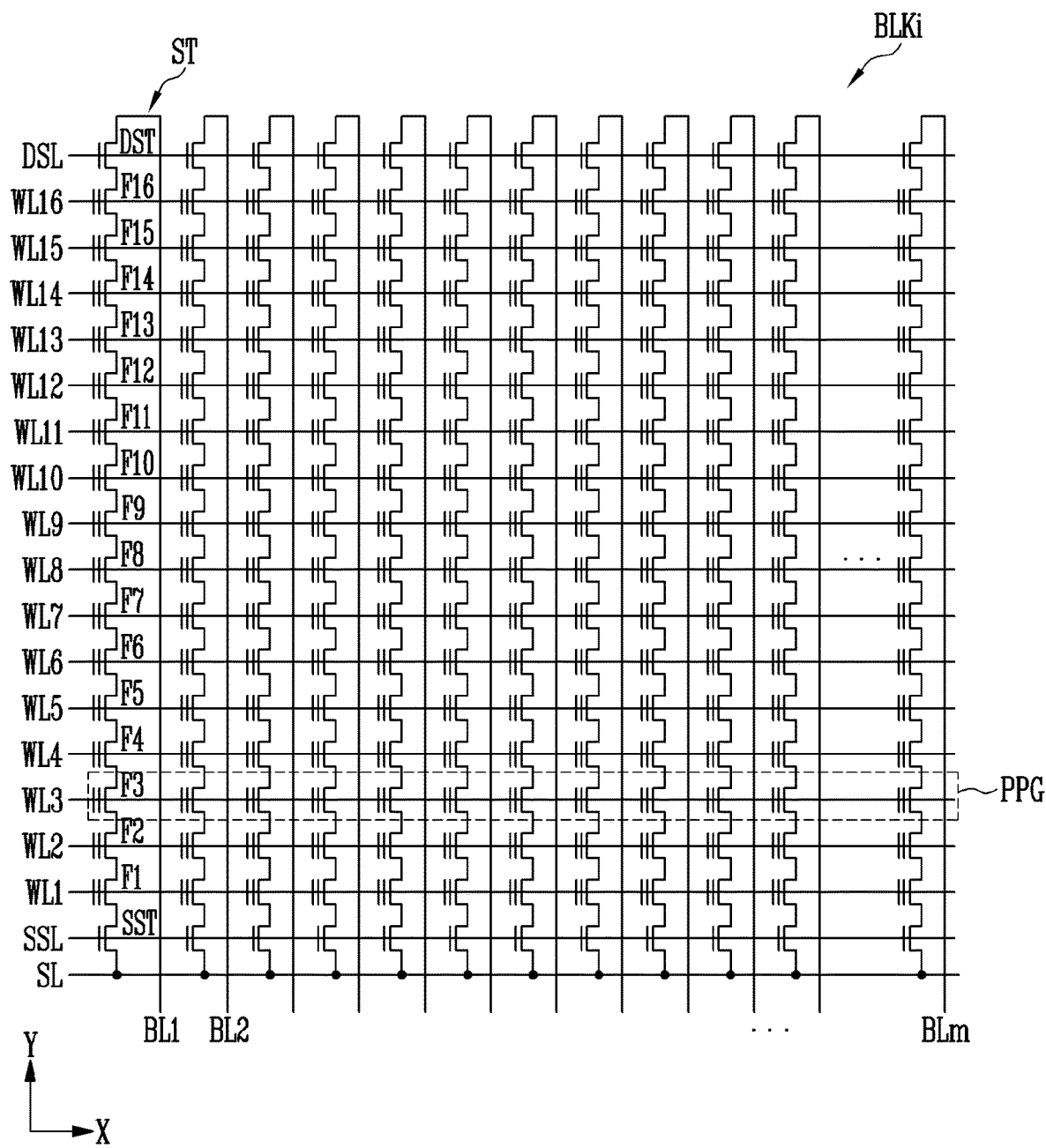
FIG. 5 is a diagram illustrating an embodiment of a memory block of FIG. 4.

FIG. 5 is a diagram illustrating one embodiment of a representative memory block BLKi of FIG. 4.

Referring to FIG. 5, the memory block BLKi may be configured such that a plurality of word lines arranged in parallel may be coupled between a first select line and a second select line. The first select line may be a source select line SSL and the second select line may be a drain select line DSL. More specifically, the memory block BLKi may include a plurality of strings ST coupled between the bit lines BL1 to BLm and a source line SL. The bit lines BL1 to BLm may be coupled to the strings ST, respectively, and the source line SL may be commonly coupled to the strings ST. The strings ST may have the same configuration. Thus, the string ST coupled to the first bit line BL1 will be described in detail as an example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST, and may include more than sixteen memory cells F1 to F16 as shown in FIG. 5.

A source of the source select transistor SST may be coupled to the source line SL and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to a plurality of word lines WL1 to WL16, respectively. A group of memory cells coupled to the same word line, among the memory cells included in the different strings ST, may be referred to as a physical page PPG. Therefore, the memory block BLKi may include as many physical pages PPG as the number of word lines WL1 to WL16.

A single memory cell may store one bit of data. This memory cell is referred to as a single level cell (SLC). One physical page PPG may store one logical page (LPG) data. Data of the single logical page LPG may include as many data bits as the number of cells included in the single physical page PPG. Alternatively, however, a single memory cell may store two or more bits of data. This memory cell is referred to as a multi-level cell (MLC). One physical page PPG may store data corresponding to two or more logical pages LPG.

A plurality of memory cells included in one physical page PPG may be simultaneously programmed. In other words, the memory device 200 may perform a program operation on each physical page PPG. A plurality of memory cells included in a single memory block may be simultaneously erased. In other words, the memory device 200 may perform an erase operation in a unit of the memory block BLKi. For example, to update a portion of the data stored in one memory block BLKi, all data stored in BLKi may be read, the portion of the data which is to be updated may be changed, and all data may then be programmed into another memory block.

Figure 6:
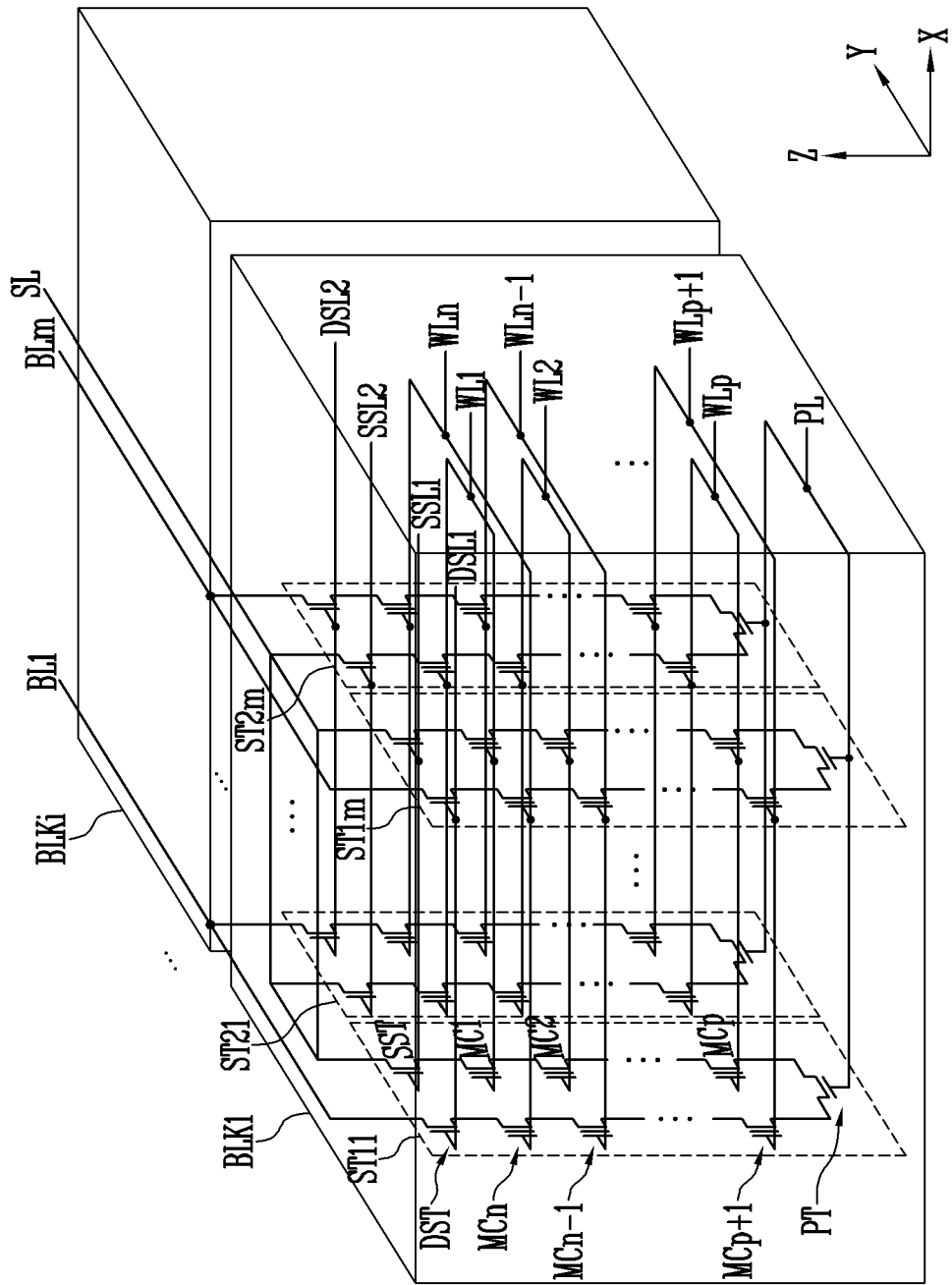
FIG. 6 is a diagram illustrating an example of three-dimensionally structured memory blocks.

FIG. 6 is a diagram illustrating an example of three-dimensionally structured memory blocks.

Referring to FIG. 6, the memory cell array 210 may include the plurality of memory blocks BLK1 to BLKi. For example, the first memory block BLK1 may include a plurality of strings ST11 to ST1$m$ and ST21 to ST2$m$. According to an embodiment, each of the plurality of strings ST11 to ST1$m$ and ST21 to ST2$m$ may have a 'U' shape. In the first memory block BLK1, 'm' strings may be arranged in a row direction (X direction). By way of example, FIG. 6 illustrates two strings arranged in a column direction (Y direction). However, three or more strings may be arranged in the column direction (Y direction).

Each of the plurality of strings ST11 to ST1$m$ and ST21 to ST2$m$ may include at least one source select transistor SST, first to nth memory cells MC1 to MCn, a pipe transistor PT, and at least one drain select transistor DST.

The source and drain select transistors SST and DST may have similar structures and the memory cells MC1 to MCn may have similar structures. For example, each of the source and drain select transistors SST and DST and the memory cells MC1 to MCn may include a channel layer, a tunnel insulating layer, a charge trap layer, and a blocking insulating layer. For example, a pillar for providing a channel layer may be provided in each string. For example, a pillar for providing at least one of the channel layer, the tunnel insulating layer, the charge trap layer and the blocking insulating layer may be provided in each string.

The source select transistor SST of each string ST may be coupled between the source line SL and memory cells MC1 to MCp.

According to an embodiment, source select transistors of strings arranged in the same row may be coupled to a source select line extending in a row direction, and source select transistors of strings arranged in different rows may be coupled to different source select lines. As shown in FIG. 6, source select transistors of the strings ST11 to ST1$m$ in the first row may be coupled to a first source select line SSL1. The source select transistors of the strings ST21 to ST2$m$ in a second row may be coupled to a second source select line SSL2.

According to another embodiment, the source select transistors of the strings ST11 to ST1$m$ and ST21 to ST2$m$ may be commonly coupled to one source select line.

The first to nth memory cells MC1 to MCn of each string may be coupled between the source select transistor SST and the drain select transistor DST.

The first to nth memory cells MC1 to MCn may be divided into the first to pth memory cells MC1 to MCp and (p+1)th to nth memory cells MCp+1 to MCn. The first to pth memory cells MC1 to MCp may be sequentially arranged in a vertical direction (Z direction) and be coupled in series between the source select transistor SST and the pipe transistor PT. The (p+1)th to nth memory cells MCp+1 to MCn may be sequentially arranged in the vertical direction (Z direction) and be coupled in series between the pipe transistor PT and the drain select transistor DST. The first to pth memory cells MC1 to MCp and the (p+1)th to nth memory cells MCp+1 to MCn may be coupled to each other through the pipe transistor PT. Gates of the first to nth memory cells MC1 to MCn of each string may be coupled to the first to nth word lines WL1 to WLn, respectively.

According to an embodiment, at least one of the first to nth memory cells MC1 to MCn may serve as a dummy memory cell. When the dummy memory cell is provided, a voltage or current of the corresponding string may be stably controlled. A gate of the pipe transistor PT of each string may be coupled to a pipe line PL.

The drain select transistor DST of each string may be coupled between the corresponding bit line and the memory cells MCp+1 to MCn. Strings arranged in the row direction may be coupled to the corresponding drain select line extending in the row direction. The drain select transistors DST of the strings ST11 to ST1$m$ in the first row may be coupled to the first drain select line DSL1. The drain select transistors DST of the strings ST21 to ST2$m$ in the second row may be coupled to the second drain select line DSL2.

The strings arranged in the column direction may be coupled to bit lines extending in the column direction. As illustrated in FIG. 6, the strings ST11 and ST21 in the first column may be coupled to the first bit line BL1. The strings ST1$m$ and ST2$m$ in the mth column may be coupled to the mth bit line BL$m$.

Memory cells coupled to the same word line, among strings arranged in the row direction, may form a single page. For example, memory cells coupled to the first word line WL1, among the strings ST11 to ST1m in the first row, may constitute one page. Among the strings ST21 to ST2m in the second row, memory cells coupled to the first word line WL1 may constitute another page. When one of the drain select lines DSL1 and DSL2 is selected, strings arranged in one row direction may be selected. When one of the word lines WL1 to WLn is selected, one page among selected strings may be selected.

Figure 7:
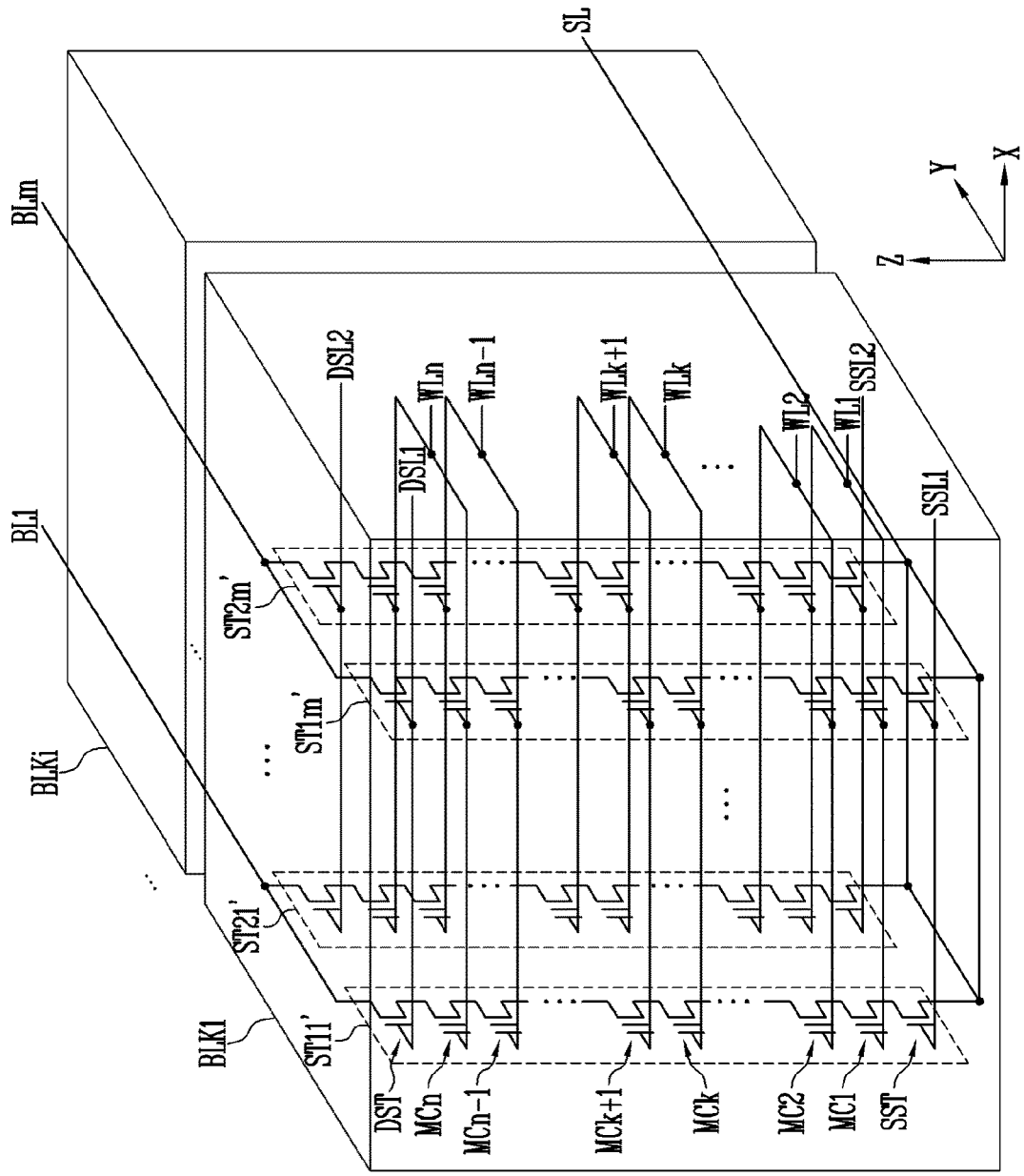
FIG. 7 is a diagram illustrating another embodiment of three-dimensionally structured memory blocks.

FIG. 7 is a diagram illustrating another embodiment of three-dimensionally structured memory blocks.

Referring to FIG. 7, the memory cell array 210 may include the plurality of memory blocks BLK1 to BLKi. For example, the first memory block BLK1 may include a plurality of strings ST11' to ST1m' and ST21' to ST2m'. Each of the strings ST11' to ST1m' and ST21' to ST2m' may extend along a vertical direction (e.g., Z direction). In the memory block BLKi, 'm' strings may be arranged in a row direction (X direction). By way of example, FIG. 7 illustrates two strings arranged in a column direction (Y direction). However, three or more strings may be arranged in the column direction (Y direction).

Each of the plurality of strings ST11' to ST1m' and ST21' to ST2m' may include at least one source select transistor SST, the first to nth memory cells MC1 to MCn, and at least one drain select transistor DST.

The source select transistor SST of each string may be coupled between the source line SL and the memory cells MC1 to MCn. Source select transistors of strings arranged in the same row may be coupled to the same source select line. The source select transistors SST of the strings ST11' to ST1m' arranged in the first row may be coupled to the first source select line SSL1. The source select transistors SST of the strings ST21' to ST2m' arranged in the second row may be coupled to the second source select line SSL2. According to another embodiment, the source select transistors SST of the strings ST11' to ST1m' and ST21' to ST2m' may be commonly coupled to a single source select line.

The first to nth memory cells MC1 to MCn of each string may be coupled in series between the source select transistor SST and the drain select transistor DST. Gates of the first to nth memory cells MC1 to MCn may be coupled to first to nth word lines WL1 to WLn, respectively.

According to an embodiment, at least one of the first to nth memory cells MC1 to MCn may serve as a dummy memory cell. When the dummy memory cell is provided, a voltage or current of the corresponding string may be stably controlled. As a result, the reliability of the data stored in the first memory block BLK1 may be improved.

The drain select transistor DST of each string may be coupled between the corresponding bit line and the memory cells MC1 to MCn. The drain select transistors DST of strings arranged in the row direction may be coupled to a drain select line extending in the row direction. The drain select transistors DST of the strings ST11' to ST1m' in the first row may be coupled to the first drain select line DSL1. The drain select transistors DST of the strings ST21' to ST2m' in the second row may be coupled to the second drain select line DSL2.

That is, the first memory block BLK1 of FIG. 7 may have an equivalent circuit similar to that of the first memory block BLK1 of FIG. 6 except that the pipe transistor PT is excluded from each string.

Figure 8:
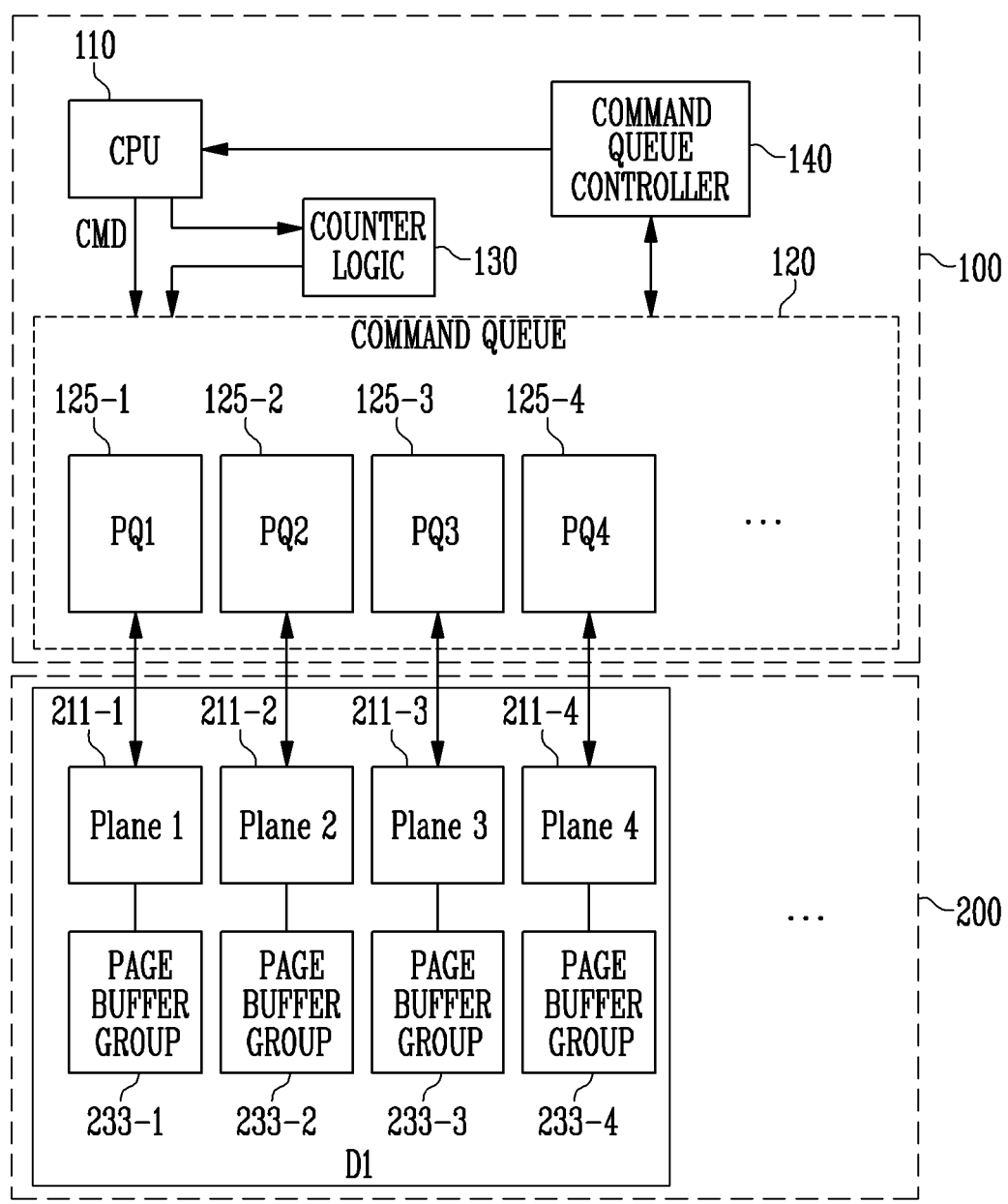
FIG. 8 is a diagram illustrating operations of a memory controller and a memory device according to an embodiment of the present disclosure.

FIG. 8 is a diagram illustrating operations of the controller 100 and the memory device 200 according to an embodiment of the present disclosure.

FIG. 8 shows the controller 100 and the memory device 200. The controller 100 may include the CPU 110, the command queue 120 including a plurality of plane queues (PQ) 125-1 to 125-4, the counter logic 130, and the command queue controller 140. The memory device 200 may include a plurality of dies, each of which may be configured the same or substantially the same as the first die D1 shown in FIG. 8 by way of example. The first die D1 may include a plurality of planes 211-1 to 211-4 and a plurality of page buffer groups 233-1 to 233-4. FIG. 8 illustrates one die, e.g., D1, including four planes 211-1 to 211-4 and four page buffer groups 233-1 to 233-4. However, the number of planes and the number of page buffer groups included in each die are not limited to four. Each die may include any suitable number of planes and associated page buffer groups.

The CPU 110 may perform a logical operation for controlling the operations of the controller 100. More specifically, the CPU 110 may generate a command corresponding to a request from the host. For example, the CPU 110 may generate various commands for a program operation, a read operation, an erase operation, a suspend operation and a parameter setting operation.

The CPU 110 may generate a command by which the memory device 200 performs an operation according to a plane interleaving scheme. According to the plane interleaving scheme, an operation (e.g., a read operation) corresponding to the request from the host may be distributed and processed simultaneously among different planes in the same die. For example, when an operation is controlled using the plane interleaving scheme, the first to fourth planes 211-1 to 211-4 may operate independently of each other.

According to an embodiment, the CPU 110 may generate a plane level command and store the generated plane level command in the command queue 120. More specifically, the CPU 110 may generate a plane level command and control the command queue 120 to store the plane level command in a plane queue corresponding to address information of the plane level command. The address information may include a logical block address LBA provided by the host 2000 and a corresponding physical block address PBA. In response to the plane level command, the memory device 200 may perform an operation on one among the planes 211-1 to 211-4.

According to an embodiment, the CPU 110 may generate a die level command and store the generated die level command in the command queue 120. More specifically, the CPU 110 may generate a die level command and store the die level command in a plane queue having the lowest score of the plurality of plane queues. In response to the die level command, the memory device 200 may perform an operation on the die D1. The die level command and the plane level command may be different in that their respective operations are performed on different levels (i.e., a die and a plane). A die level command may operate on the specific die to which such command is directed regardless of which plane queue the die level command is stored in. Therefore, for uniform latency performance of the plurality of plane queues, the CPU 110 may store the die level command in the plane queue having the lowest score of the plurality of plane queues. Each score may be in the form of score information, which is described in more detail below.

The command queue 120 may include a plurality of plane queues corresponding to a plurality of planes. More specifically, the number of plane queues may be the same as the number of planes corresponding thereto. For example, the first to fourth plane queues 125-1 to 125-4 may correspond to the first to fourth planes 211-1 to 211-4, respectively. According to an embodiment, the command queue 120 may store (i.e., queue-in) a command generated by the CPU 110 and may output (i.e., queue-out) the generated command to each of the plurality of planes corresponding thereto, or to the memory device 200 in general. However, the number of plane queues may be smaller than the number of planes corresponding thereto. For example, one plane queue may correspond to two planes.

The counter logic 130 may assign number information and flag information to a command. More specifically, the counter logic 130 may assign to the command, number information corresponding to an order in which the command is generated by the CPU 110. For example, five bits may be allocated to represent the number information. The counter logic 130 may assign the number information to the command by expressing numbers from zero (0) to thirty-one (31) in the binary system according to the order in which the command is generated. The counter logic 130 may assign number information from 0 to 31 according to the order in which the command is generated, and may assign number information again from 0.

In addition, the counter logic 130 may assign flag information to the command. The flag information may indicate whether the command is a die level command for performing an operation at a die level, or a plane level command for performing an operation at a plane level. FIG. 8 shows that the counter logic 130 is separate from the CPU 110. However, the present disclosure is not limited thereto. The CPU 110 may include the counter logic 130 as a subcomponent. In another example, the CPU 110 may be configured to perform the operations of the counter logic 130.

The command queue controller 140 may calculate score information, e.g., a score, for each of the plurality of plane queues included in the command queue 120. The score for a particular plane queue may indicate the total estimated time to process commands stored in the corresponding plane queue. The command queue controller 140 may calculate a score for each plane queue on the basis of an estimated processing time set beforehand according to a type of each command in the corresponding plane queue. For example, the command queue controller 140 may estimate that it takes 50 us (micro-seconds) to process a read command, 1200 us (micro-seconds) to process a program command, and 5 us (micro-seconds) to process an erase command. The command queue controller 140 may set the estimated amount of time to process each command according to its type and calculate a score for the corresponding plane queue based on the estimated processing time. In addition, the command queue controller 140 may output to the CPU 110 the score corresponding to each plane queue.

The command queue controller 140 may control the command queue 120 to transfer the commands stored in the command queue 120 to the memory device 200. According to an embodiment, the command queue controller 140 may control the plurality of plane queues so that the commands are queued-out from each plane queue on a first-in-first-out (FIFO) basis.

According to an embodiment, when the command queue 120 stores commands including different flag information (e.g., a die level command and a plane level command), the command queue controller 140 may control the plurality of plane queues to queue-out the commands including the different flag information on a FIFO basis. More specifically, when a die level command is to be transferred (i.e., queued-out) from a plane queue to the memory device 200 or to the plane, the command queue controller 140 may control the command queue 120 so as to stop transferring (i.e., queueing-out) plane level commands. In other words, when a die level command is to be transferred (i.e., queued-out), the command queue controller 140 may control the command queue 120 so that the die level command may be transferred to a plane according to the number information. FIG. 8 shows that the command queue controller 140 is separate from the CPU 110. However, the present disclosure is not limited thereto. The CPU 110 may include the command queue controller 140 as a subcomponent. In another example, the CPU 110 may be configured to perform the operations of the command queue controller 140.

The memory device 200 may include a plurality of dies, each of which may include multiple planes. The first die D1, for example, may include the first to fourth planes 211-1 to 211-4. In addition, the page buffer groups 233-1 to 233-4 may be coupled to the first to fourth planes 211-1 to 211-4, respectively. In addition, the first to fourth planes 211-1 to 211-4 may be coupled to the first to fourth plane queues 125-1 to 125-4, respectively.

In addition, even when the first to fourth planes 211-1 to 211-4 are included in the same die D1, the first to fourth planes 211-1 to 211-4 may perform operations independently of each other in response to a plane interleaving command from the command queue 120. The plane interleaving command may refer to a plane level command for performing an operation at a plane level.

Conventionally, when a die level command for performing an operation at a die level is generated during a plane interleaving operation, the die level command may not be transferred to a command queue, and a wait time may occur until all plane level commands for performing operations in a plane level are emptied from the command queue. Besides, the plane level command for performing the plane interleaving operation may not be queued in the command queue until the operation directed by the die level command is completely performed. However, according to an embodiment, since a die level command and a plane level command are distinguished from each other on the basis of flag information, the corresponding command may be transferred to the command queue without waiting until the die level command or the plane level command is queued-out from the command queue. According to an embodiment, no wait time may occur until a plane level command or a die level command is queued-out from the command queue, and the memory device 200 may be prevented from entering an idle state.

By way of example, FIG. 8 illustrates that the number of plane queues 125-1 to 125-4 is the same as the number of planes 211-1 to 211-4 in the first die D1, and that the plane queues 125-1 to 125-4 are coupled to the planes 211-1 to 211-4, respectively, in a one-to-one relationship. However, embodiments of the present disclosure are not limited to this configuration. For example, two or more planes may correspond to one plane queue.

Figure 9:
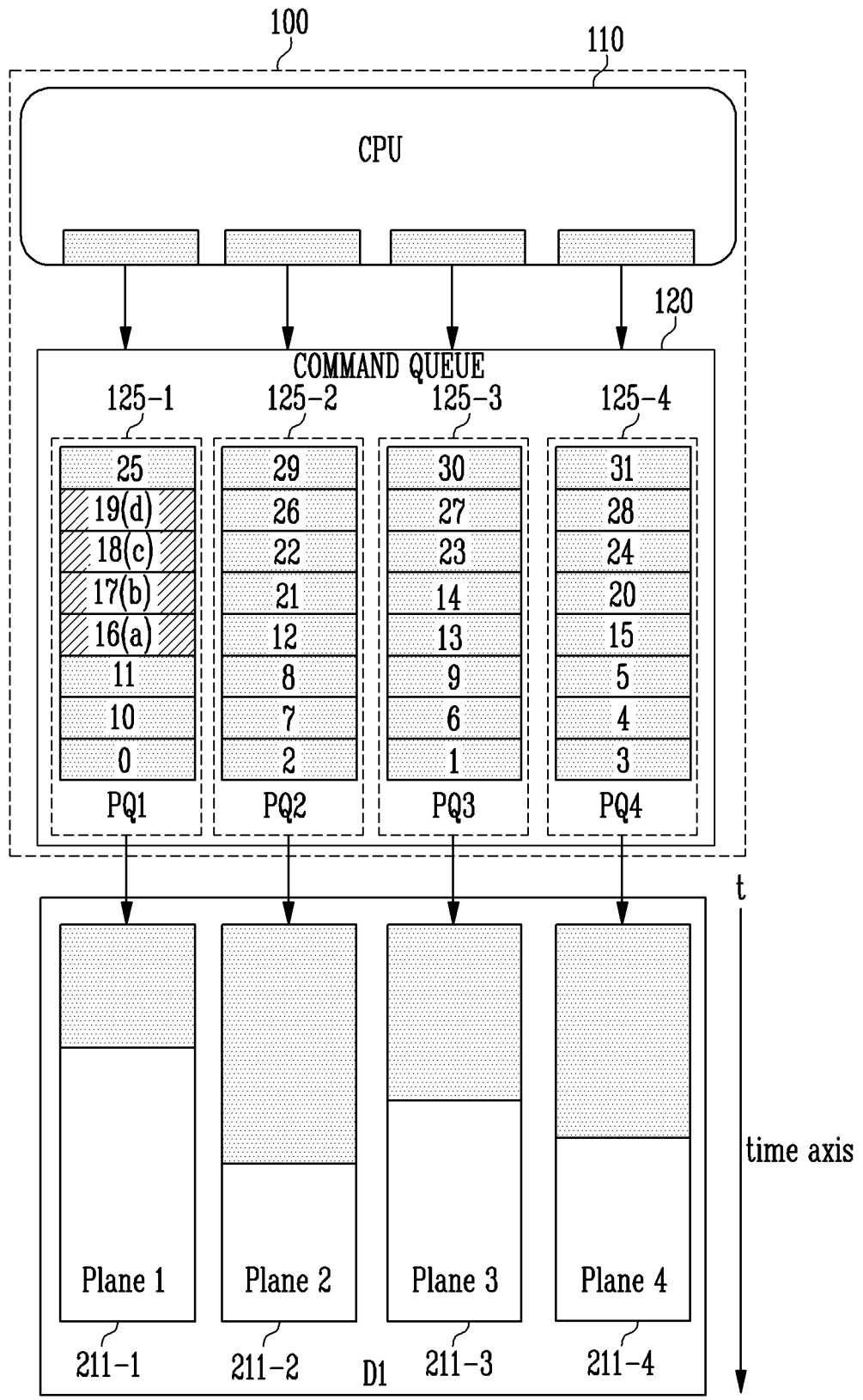
FIG. 9 is a diagram illustrating a method of managing commands by a command queue according to an embodiment of the present disclosure.
Figure 10:
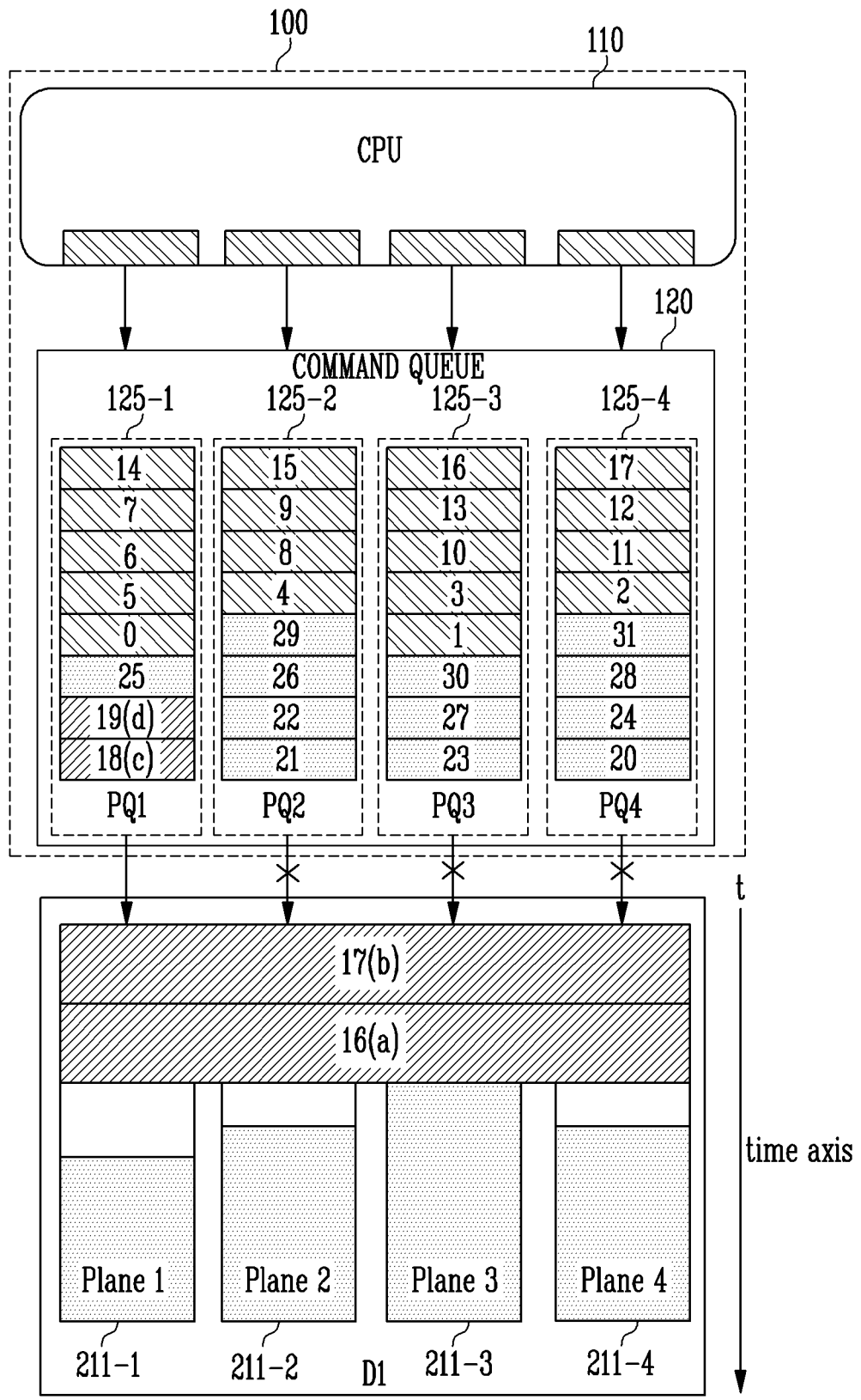
FIG. 10 is a diagram illustrating a method of managing commands by a command queue according to an embodiment of the present disclosure.

FIGS. 9 and 10 are diagrams illustrating a method of managing commands by a command queue according to an embodiment of the present disclosure.

FIGS. 9 and 10 illustrate the controller 100 including the CPU 110 and the command queue 120, and the first die D1 including the first to fourth planes 211-1 to 211-4.

The controller 100 may control each of the first to fourth plane queues 125-1 to 125-4 so that the commands are queued-in into and queued-out from each of the first to fourth plane queues 125-1 to 125-4 on the first-in-first-out (FIFO) basis. The controller 100 may assign number information to the commands according to the order in which the commands are generated. A plurality of entries may be queued in each of the first to fourth plane queues 125-1 to 125-4 according to the order in which the plurality of entries are generated. An entry may refer to a unit that each plane queue queues-in and queues-out. A single entry may include a single command, as well as number information and flag information associated with the single command.

Referring to FIG. 9, the controller 100 may first transfer an entry, to which number information 0 (zero) is assigned, from the first plane queue 125-1 to the first plane 211-1. In addition, the controller 100 may transfer the other entries to the memory device 200 on a FIFO basis in each plane queue after transferring the entry with the number information 0.

Each plane queue may independently transfer an entry to a corresponding one of the plurality of planes. More specifically, each plane queue may transfer or queue-out its plane level command entries to the corresponding plane on a FIFO basis, whereas plane level command entries queued in different plane queues may not be queued-out on a FIFO basis. For example, a plane level command, to which number information 15 is assigned, may be queued-out from the fourth plane queue 125-4 to the memory device 200 before a plane level command, to which number information 14 is assigned, is queued-out from the third plane queue 125-3. In other words, FIFO may be applied among plane level command entries in the same plane queue and may not be applied among plane level command entries in different plane queues.

In addition, the controller 100 may store commands including different flag information in the command queue 120. For example, entries corresponding to commands, to which number information 16(a), 17(b), 18(c) and 19(d) are respectively assigned, may have different flag information from entries corresponding to commands, to which number information 0 to 15 and 20 to 31 are respectively assigned, as illustrated in FIG. 9.

With respect to die level commands having number information of 16(a), 17(b), 18(c) and 19(d), respectively, and plane level commands having number information of 0 to 15 and 20 to 31, respectively, the controller 100 may control the command queue 120 so that FIFO may be applied, not to each of the plane queues 125-1 to 125-4 individually, but to the command queue 120. As exemplified in FIG. 10, the commands to which number information of 16(a), 17(b), 18(c) and 19(d) are assigned, may be die level commands, and all other commands may be plane level commands. Since the command, to which the number information 16(a) is assigned, is a die level command, the controller 100 may stop transferring, from the command queue 120 to the memory device 200, the plane level commands assigned number of 21, 24 and 20 which are lower in order than the number 16. After the command having the number 19(d) is processed, the controller 100 may resume transferring the plane level commands having number 20 or 21. In other words, when a die level command having a particular number information is to be transferred from the command queue 120 to the memory device 200, the controller 100 may control all plane queues 125-1 to 125-4 in the command queue 120 so that transfer of any plane level command having a higher number than the die level command from the command queue 120 to the memory device 200 may be paused according to FIFO basis of the command queue level. To sum up, according to an embodiment of the present disclosure, each plane queue 125-1 to 125-4 in the command queue 120 may independently operate on a FIFO basis with respect to plane level commands, while all plane queues 125-1 to 125-4 in the command queue 120 may cooperatively operate on a command-queue-level FIFO basis for die level commands and plane level commands. The command queue 120 may correspond to a die, e.g., D1, and the plane queues 125-1 to 125-4 in the command queue 120 may respectively correspond to the planes 211-1 to 211-4 in D1.

The controller 100 may assign number information in the form of allocated bits (e.g., 5 bits) to each command, starting with 0 number information. The controller 100 may repeat the number assigning process after assigning all possible 5 bit values, starting again with 0.

Figure 11:
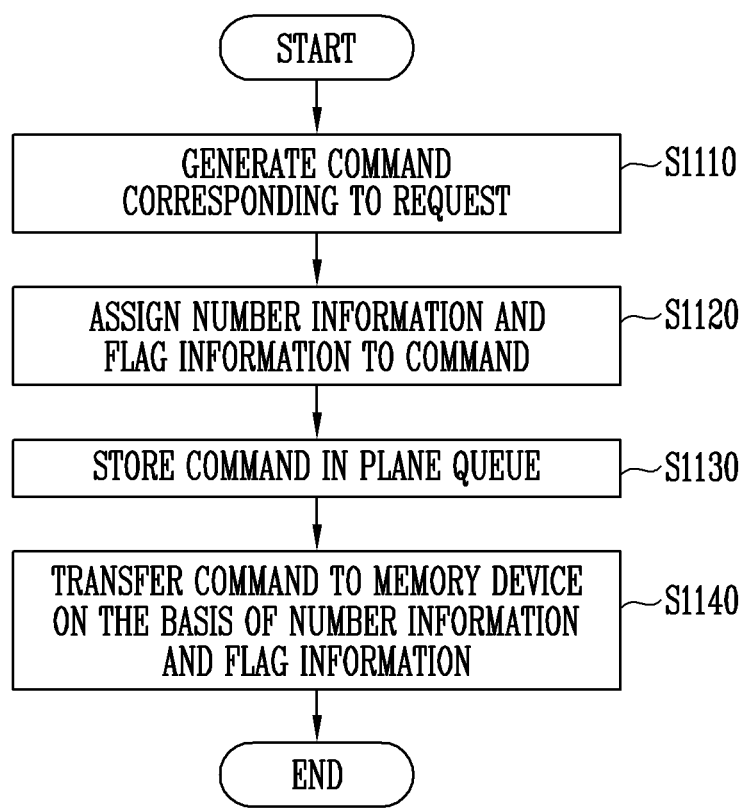
FIG. 11 is a flowchart illustrating a method of operating a memory controller according to an embodiment of the present disclosure.

FIG. 11 is a flowchart illustrating a method of operating the controller 100 according to an embodiment of the present disclosure.

At operation S1110, the controller 100 may generate a command corresponding to a request from the host. For example, the controller 100 may generate a read command, a program command, an erase command or a parameter set command.

At operation S1120, the controller 100 may assign a number (or information indicative thereof) and a flag (or information indicative thereof) to the generated command. The number may correspond to an order in which the command is generated. The flag may indicate a level, e.g., die or plane, at which an operation according to the command is performed. In other words, the flag may indicate whether the command is a die level command for performing an operation at a die level or a plane level command for performing an operation at a plane level.

The controller 100 may calculate a score (or information thereof) indicating a total estimated time to process commands stored in each of the plurality of plane queues. More specifically, the controller 100 may calculate a score corresponding to each of the plurality of plane queues on the basis of an estimated processing time set beforehand according to a type of each of the commands. That is, each plane queue has a score indicative of the estimated time to process all commands in that plane queue.

At operation S1130, the controller 100 may store a command in a plane queue. More specifically, the controller 100 may store the command in the plane queue corresponding to the command among the plurality of plane queues. According to an embodiment, when the flag information indicates that the command is a die level command for performing an operation at a die level, the controller 100 may store the command in a plane queue having the lowest score of the plurality of plane queues.

According to an embodiment, when the flag information indicates that the command is a plane level command for performing an operation at a plane level, the controller 100 may store the command in a plane queue corresponding to address information of the command.

At operation S1140, the controller 100 may transfer the command to the memory device 200 on the basis of the number and the flag of the command. According to an embodiment, the controller 100 may transfer the command to the memory device 200 in FIFO order with respect to the other commands in the corresponding plane queue. In addition, the controller 100 may transfer plane level commands stored in different plane queues independently of each other.

According to an embodiment, when commands having different flag information are stored in the plurality of plane queues, the controller 100 may transfer the commands to the memory device 200 so that the commands having the different flag information may be queued in FIFO order with respect to the command queue 120, not the individual plane queues 125-1 to 125-4.

According to an embodiment, when a command to be transferred from one of the plurality of plane queues to the memory device 200 is a die level command for performing an operation at a die level, the controller 100 may stop transferring a plane level command with reference to number information of the die level command. In other words, the controller 100 may control the command queue 120 so that die level commands and plane level commands may be queued in FIFO order with respect to the command queue 120, not the individual plane queues 125-1 to 125-4.

Figure 12:
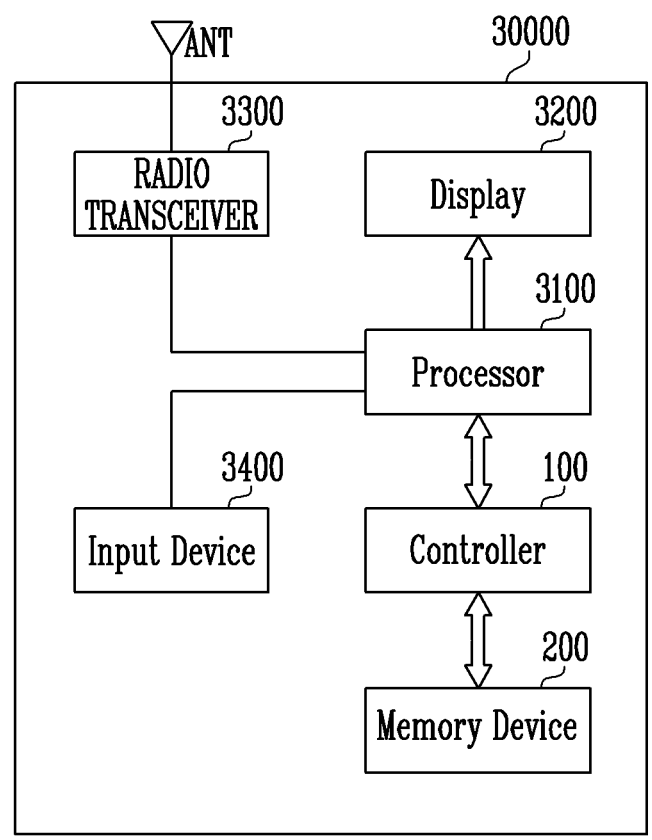
FIG. 12 is a diagram illustrating another example of a memory system including a memory controller and a memory device, such as those shown in FIGS. 1 to 3.

FIG. 12 is a diagram illustrating another embodiment of the memory system 1000 including the controller 100 and the memory device 200 as shown in FIGS. 1 to 3.

Referring to FIG. 12, a memory system 30000 may be embodied into a cellular phone, a smart phone, a tablet computer, a personal computer (PC), a personal digital assistant (PDA), or a wireless communication device. The memory system 30000 may include the memory device 200 and the controller 100 controlling the operations of the memory device 200. The memory device 200 as shown in FIG. 12 may correspond to the memory device 200 as shown in FIGS. 1 to 3. The controller 100 as shown in FIG. 12 may correspond to the controller 100 as shown in FIGS. 1 to 3.

The controller 100 may control a data access operation of the memory device 200, for example, a program operation, an erase operation, or a read operation in response to control of a processor 3100.

The controller 100 may control data programmed into the memory device 200 to be output through a display 3200 in response to control of the processor 3100.

A radio transceiver 3300 may exchange a radio signal through an antenna ANT. For example, the radio transceiver 3300 may convert the radio signal received through the antenna ANT into a signal which can be processed by the processor 3100. Therefore, the processor 3100 may process the signal output from the radio transceiver 3300 and transfer the processed signal to the controller 100 or the display 3200. The controller 100 may program the signal processed by the processor 3100 into the memory device 200. In addition, the radio transceiver 3300 may convert a signal output from the processor 3100 into a radio signal and output the radio signal to an external device through the antenna ANT. A control signal for controlling the operations of the processor 3100 or data to be processed by the processor 3100 may be input by the input device 3400, and the input device 3400 may include a pointing device, such as a touch pad and a computer mouse, a keypad, or a keyboard. The processor 3100 may control the operations of the display 3200 so that data output from the controller 100, data output from the radio transceiver 3300, or data output from an input device 3400 may be output through the display 3200. According to an embodiment, the controller 100 controlling the operations of the memory device 200 may form part of the processor 3100, or may be formed as a separate chip from the processor 3100.

Figure 13:
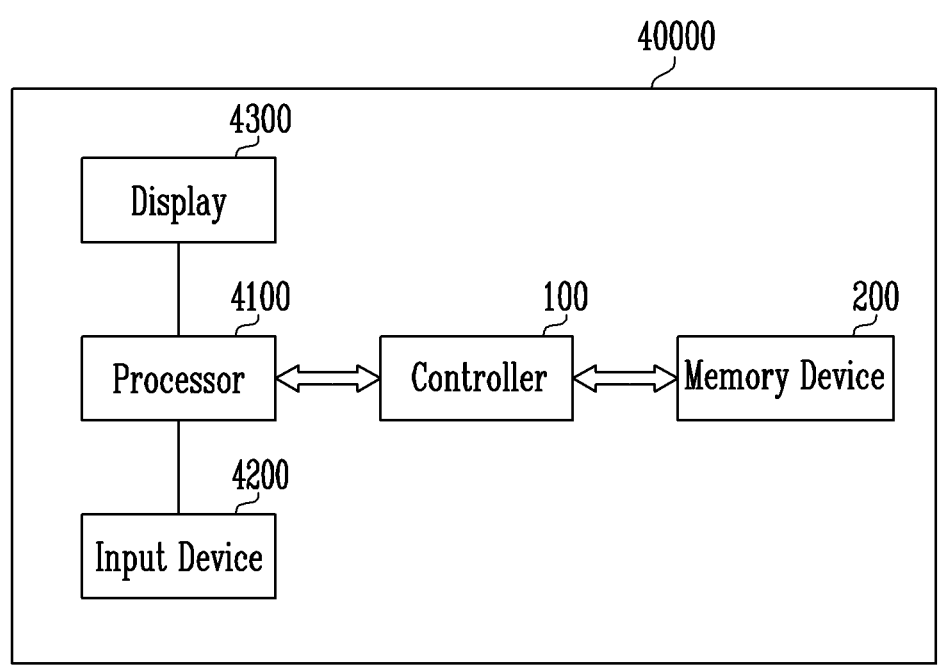
FIG. 13 is a diagram illustrating another example of a memory system including a memory controller and a memory device, such as those shown in FIGS. 1 to 3.

FIG. 13 is a diagram illustrating another embodiment of the memory system 1000 including the controller 100 and the memory device 200 as shown in FIGS. 1 to 3.

Referring to FIG. 13, a memory system 40000 may be embodied into a personal computer (PC), a tablet computer, a net-book, an e-reader, a personal digital assistant (PDA), a portable multimedia player (PMP), an MP3 player, or an MP4 player.

The memory system 40000 may include the memory device 200 and the controller 100 controlling a data processing operation of the memory device 200. The memory device 200 as shown in FIG. 13 may correspond to the memory device 200 as shown in FIGS. 1 to 3. The controller 100 as shown in FIG. 13 may correspond to the controller 100 as shown in FIGS. 1 to 3.

A processor 4100 may output data stored in the memory device 200 through a display 4300 according to data input through an input device 4200. Examples of the input device 4200 may include a pointing device such as a touch pad or a computer mouse, a keypad, or a keyboard.

The processor 4100 may control various operations of the memory system 40000 and control the operations of the controller 100. According to an embodiment, the controller 100 controlling the operations of the memory device 200 may be part of the processor 4100, or be formed as a separate chip from the processor 4100.

Figure 14:
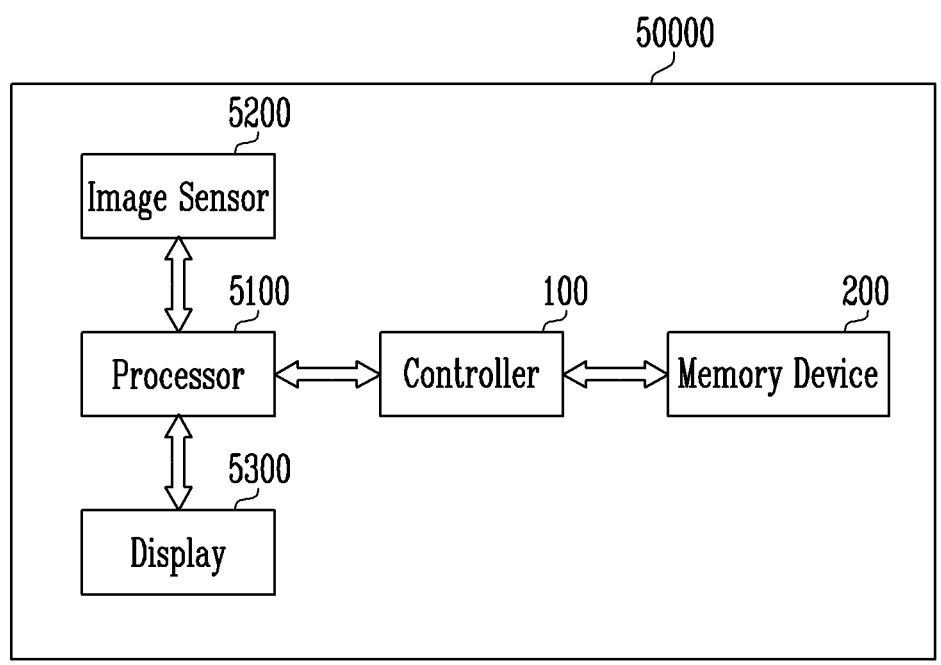
FIG. 14 is a diagram illustrating another example of a memory system including a memory controller and a memory device, such as those shown in FIGS. 1 to 3.

FIG. 14 is a diagram illustrating another embodiment of the memory system 1000 including the controller 100 and the memory device 200 as shown in FIGS. 1 to 3.

Referring to FIG. 14, a memory system 50000 may be embodied into an image processor, for example, a digital camera, a cellular phone with a digital camera attached thereto, a smart phone with a digital camera attached thereto, or a table PC with a digital camera attached thereto.

The memory system 50000 may include the memory device 200 and the controller 100 controlling a data processing operation of the memory device 200, for example, a program operation, an erase operation or a read operation. The memory device 200 as shown in FIG. 14 may correspond to the memory device 200 as shown in FIGS. 1 to 3. The controller 100 as shown in FIG. 14 may correspond to the controller 100 as shown in FIGS. 1 to 3.

An image sensor 5200 of the memory system 50000 may convert an optical image into digital signals, and the digital signals may be transferred to a processor 5100 or the controller 100. In response to control of the processor 5100, the digital signals may be output through a display 5300 or stored in the memory device 200 through the controller 100. In addition, the data stored in the memory device 200 may be output through the display 5300 according to control of the processor 5100 or the controller 100.

According to an embodiment, the controller 100 controlling the operations of the memory device 200 may be part of the processor 5100, or be formed as a separate chip from the processor 5100.

Figure 15:
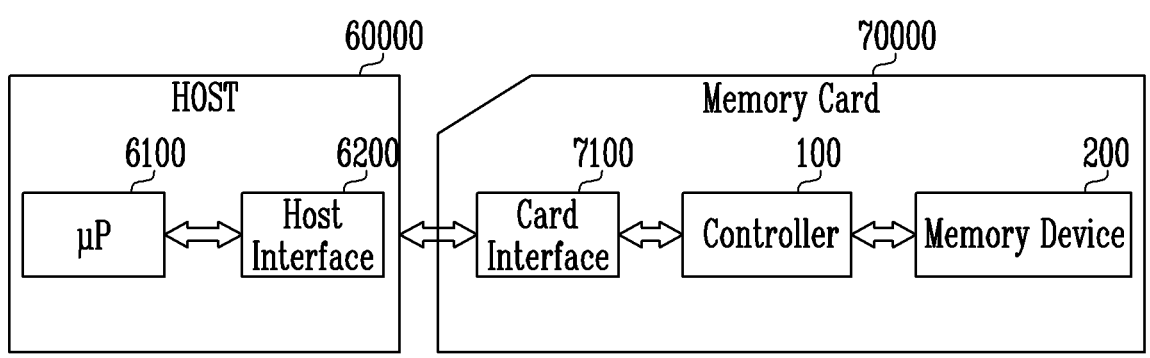
FIG. 15 is a diagram illustrating another example of a memory system including a memory controller and a memory device, such as those shown in FIGS. 1 to 3.

FIG. 15 is a diagram illustrating another embodiment of the memory system 1000 including the controller 100 and the memory device 200 as shown in FIGS. 1 to 3.

Referring to FIG. 15, a memory system 70000 may include a memory card or a smart card. The memory system 70000 may include the memory device 200, the controller 100, and a card interface 7100. The memory device 200 as shown in FIG. 15 may correspond to the memory device 200 as shown in FIGS. 1 to 3. The controller 100 as shown in FIG. 15 may correspond to the controller 100 as shown in FIGS. 1 to 3.

The controller 100 may control data exchange between the memory device 200 and the card interface 7100. According to an embodiment, the card interface 7100 may be, but is not limited to, a secure digital (SD) card interface or a multi-media card (MMC) interface.

The card interface 7100 may interface data exchange between a host 60000 and the controller 100 according to a protocol of the host 60000. In accordance with an embodiment, the card interface 7100 may support a Universal Serial Bus (USB) protocol and an InterChip (IC)-USB protocol. The card interface 7100 may refer to hardware capable of supporting a protocol which is used by the host 60000, software coupled for execution by the hardware, or a signal transmission method.

When the memory system 70000 is connected to a host interface 6200 of the host 60000 such as a personal computer (PC), a tablet computer, a digital camera, a digital audio player, a cellular phone, a console video game hardware, or a digital set-top box, the host interface 6200 may perform data communication with the memory device 200 through the card interface 7100 and the controller 100 in response to control of a microprocessor (μP) 6100.

According to an embodiment of the present disclosure, a memory controller having improved management performance and a method of operating the memory controller may be provided.

In the above-discussed embodiments, all steps need not necessarily be performed; in some cases, one or more steps may be skipped. In addition, not all steps need be performed in the stated order; steps may be performed in a different order consistent with the teachings herein. More generally, the disclosed embodiments aim to help those with ordinary knowledge in this art more clearly understand the present disclosure, rather than to limit the bounds of the present invention. In other words, those skilled in the art will be able to easily understand that, based on the technical scope of the present disclosure, various modifications can be made to any of the above-described embodiments without departing from the spirit or scope of the invention. Thus, it is intended that the present invention cover all such modifications that fall within the scope of the appended claims and their equivalents.

What is claimed is:

1. A memory controller controlling a memory device including a die including a plurality of planes, the memory controller comprising:
    a central processing unit (CPU) generating die level commands for performing an operation at a die level and plane level commands for performing an operation at a plane level corresponding to a request from a host;
    a plurality of plane queues corresponding to the plurality of planes, each of the plurality of plane queues storing one or more commands among the die level commands and the plane level commands and transferring the one or more commands to the plurality of plane queues based on a first-in-first-out (FIFO), wherein one or more plane queues among the plurality of plane queues simultaneously storing a die level command and a plane level command;
    counter logic assigning to the die level commands and the plane level commands, number information corresponding to an order in which the die level commands and the plane level commands are generated by the CPU and flag information indicating whether a command is the die level command or the plane level command; and
    a command queue controller controlling the plurality of plane queues to transfer the die level commands and the plane level commands to the plurality of planes based on an interleaving scheme,
    wherein the command queue controller
    identifies a die level command stored in an identified plane queue among the plurality of plane queues based on the flag information,
    controls, after plane level commands generated prior to the identified die level command are processed in the plurality of planes based on the number information, the identified plane queue to transfer the identified die level command to the plurality of planes,
    controls, after the identified die level command is processed in the plurality of planes, the plurality of plane queues to transfer plane level commands generated later than the identified die level command to the plurality of planes based on the number information.

2. The memory controller of claim 1,
    wherein the command queue controller calculates score information for each of the plurality plane queues indicating a total estimated time to process commands stored in the corresponding plane queue on a basis of an estimated processing time of each command stored in the corresponding plane queue.

3. The memory controller of claim 2,
    wherein the command includes one of a read command, a program command, an erase command and a parameter set command, and
    wherein the command queue controller calculates the score information for each of the plane queues on the basis of the estimated processing time set beforehand according to a type of each of the commands stored in the corresponding plane queue.

4. The memory controller of claim 2, wherein the CPU controls the plurality of plane queues to store the die level command in a plane queue having a lowest score information, based on the score information, among the plurality of plane queues.

5. The memory controller of claim 2, wherein the CPU controls the plurality of plane queues to store the plane level command in a plane queue corresponding to address information of the plane level command.

6. A method of operating a memory controller controlling a memory device including a die including a plurality of planes, the method comprising:
    generating die level commands for performing an operation at a die level and plane level commands for performing an operation at a plane level corresponding to a request from a host;
    assigning to the die level commands and the plane level commands, number information corresponding to an order in which the die level commands and the plane level commands are generated and flag information indicating whether a command is a die level command or a plane level command;
    storing the die level commands and the plane level commands in a plurality of plane queues corresponding to the plurality of planes; and
    transferring, to the plurality of planes, the die level commands and the plane level commands stored in the plurality of plane queues independently of each other,
    wherein the storing of the die level commands and the plane level commands comprises simultaneously storing the die level command and the plane level command in one or more plane queues among the plurality of plane queues,
    wherein the transferring of the die level commands and the plane level commands comprises:
    identifying a die level command in an identified plane queue among based on the flag information;
    transferring plane level commands generated prior to the identified die level command from the plurality of plane queues to the plurality of planes based on the number information;
    transferring, after the plane level commands generated prior to the identified die level command are processed in the plurality of planes, the identified die level command from the identified plane queue to the plurality of planes; and
    transferring, after the identified die level command is processed in the plurality of planes, plane level commands generated later than the identified die level command from the plurality of plane queues to the plurality of planes based on the number information.

7. The method of claim 6, further comprising calculating score information for each of the plurality of planes queues indicating a total estimated time to process commands stored in of the corresponding plane queue on a basis of an estimated processing time of each command stored in the corresponding plane queue.

8. The method of claim 7,
wherein the command includes one of a read command, a program command, an erase command and a parameter set command, and
wherein the calculating of the score information comprises calculating the score information for each of the plurality of plane queues on the basis of the estimated processing time set beforehand according to a type of each of the commands stored in the corresponding plane queue.

9. The method of claim 6, wherein the storing of the die level commands and the plane level commands comprises storing the die level command in a plane queue having a lowest score information value, among the plurality of plane queues.

10. The method of claim 6, wherein the storing of the die level commands and the plane level commands comprises storing the plane level command in a plane queue corresponding to address information of the plane level command.

* * * * *